United States Patent
West et al.

(10) Patent No.: US 6,438,493 B1
(45) Date of Patent: Aug. 20, 2002

(54) METHOD FOR SEISMIC FACIES INTERPRETATION USING TEXTURAL ANALYSIS AND NEURAL NETWORKS

(75) Inventors: Brian P. West, Houston; Steven R. May, Missouri City, both of TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 09/948,070

(22) Filed: Sep. 6, 2001

Related U.S. Application Data

(60) Provisional application No. 60/236,577, filed on Sep. 29, 2000.

(51) Int. Cl.[7] .............................................. G06F 19/00
(52) U.S. Cl. .............................................. 702/2; 703/5
(58) Field of Search ...................... 702/2, 8–12; 703/10, 703/5

(56) References Cited

U.S. PATENT DOCUMENTS

| | | | | |
|---|---|---|---|---|
| 5,465,323 A | * | 11/1995 | Mallet | 395/123 |
| 5,859,925 A | * | 1/1999 | Yaeger et al. | 382/158 |
| 5,940,777 A | | 8/1999 | Keskes | 702/16 |
| 6,044,328 A | * | 3/2000 | Murphy et al. | 702/11 |
| 6,236,942 B1 | * | 3/2001 | Bush | 702/14 |

FOREIGN PATENT DOCUMENTS

| | | | | |
|---|---|---|---|---|
| FR | WO 97/11392 | * | 3/1997 | G01V/1/30 |
| WO | WO 00/16125 | | 3/2000 | G01V/1/28 |

OTHER PUBLICATIONS

R. J. Matlock and G. T. Asimakopoulos, "Can Seismic Statigraphy Problems be Solved Using Automated Pattern Analysis and Recognition?", The Leading Edge, Geophys Explor, vol. 5, No. 9, pp. 51–55, 1986.

R. Vinter, K. Mosegaard, et al., "Seismic Texture Classification: A Computer–Aided Approach to Stratigraphic Analysis", SEG International Expo and 65th Annual Meeting, paper SL 1.4, Oct. 8–13, 1995.

R. Vintner, K. Mosegaard, I. Abatzis, C. Anderson, V. O. Vejbaek, and P. H. Nelson, "3D Seismic Texture Classification", Society of Petroleum Engineers 35482, 1996, pp. 57–63.

P. Meldahl, R. Heggland, P. F. M. de Groot and A. H. Brill, "The Chimney Cube, an Example of Semi–Automated Detection of Seismic Objects by Directive Attributes and Neural Networks: Part I—Methodology and Part II—Interpretation", Society of Exploration Geophysicists International Exposition and 69th Annual Meeting, Houston, 1999.

* cited by examiner

*Primary Examiner*—Edward Lefkowitz
*Assistant Examiner*—Victor J. Taylor
(74) *Attorney, Agent, or Firm*—Charles R. Schweppe

(57) ABSTRACT

Seismic facies are identified in a volume of seismic data, wherein, first, a plurality of initial textural attributes representative of the volume of seismic data are calculated. Next, a probabilistic neural network is constructed from the calculated initial textural attributes. Then, final textural attributes are calculated throughout the volume of seismic data. Finally, the calculated final textural attributes are classified using the constructed probabilistic neural network.

10 Claims, 5 Drawing Sheets

METHOD FOR SEISMIC FACIES INTERPRETATION USING TEXTURAL ANALYSIS AND NEURAL NETWORKS

This application claims the benefit of U.S. Provisional Application No. 60/236,577 filed Sept. 29, 2000.

FIELD OF THE INVENTION

This invention relates generally to the field of geophysical prospecting. More particularly, the invention is a method of characterizing and mapping seismic facies in seismic data.

BACKGROUND OF THE INVENTION

Seismic facies analysis is an important step in the interpretation of seismic data for reservoir characterization. Seismic facies interpretations play a significant roll in initial basin exploration, prospect evaluation, reservoir characterization, and ultimately, field development. A seismic facies is a stratigraphic unit or region that has a characteristic reflection pattern distinguishable from those of other areas. Regions of differing seismic facies are usually delineated using descriptive terms that reflect large-scale seismic patterns such as reflection amplitude, continuity, and internal configuration of reflectors bounded by stratigraphic horizons.

The application and scale of seismic facies analysis varies significantly, from basin wide applications to detailed reservoir characterization. On a basin-wide scale, reconnaissance seismic facies analysis has been applied in the study of hydrocarbon systems to broadly identify regions of source, reservoir, and seal-prone regions. These regions are usually identified on the basis of their reflection geometry as well as amplitude strength and continuity. Regionally high-amplitude, semi-continuous reflectors are often used to identify potential hydrocarbon-bearing reservoirs, such as deep-water channels, while low-amplitude continuous to semi-continuous regions can be used to identify seal-prone units.

Seismic facies analysis can also be applied within a single reservoir to help constrain a detailed physical-property characterization. In these local-scale applications, definitions of continuity and amplitude generally do not have strict definitions, and are based on rock property calibration or environment of deposition interpretations. Assuming a relationship between seismic character and physical properties can be demonstrated, seismic facies volumes can then be used to predict rock property distribution and condition geologic models.

The standard technology used for seismic facies analysis and mapping is a manual process where the seismic interpreter makes visual decisions about the character of the seismic reflection data within an interval of interest and plots these on a map. Seismic facies are then used for a variety of purposes, but primarily to interpret the distribution of lithofacies and rock properties. A skilled interpreter's perception, intuition, and experience contribute significantly to the success of seismic facies studies. However, these same strengths can also cause seismic facies analysis to be a subjective, time consuming, and often laborious task. Several related techniques have been used in the oil industry to automate and enhance the interpretation of seismic facies from seismic data.

R. J. Matlock and G. T. Asimakopoulos, "Can Seismic Stratigraphy Problems be Solved Using Automated Pattern Analysis and Recognition?", The Leading Edge, Geophys Explor, Vol. 5, no. 9, pp.51–55, 1986 lay out a conceptual framework for training of an algorithm, and thus automation, of the seismic interpretation process. However, these authors do not demonstrate any working prototype or describe any specifics of the possible attributes or classification algorithms.

R. Vintner, K. Mosegaard, et al., "Seismic Texture Classification: A Computer-Aided Approach to Stratigraphic Analysis", SEG International Exposition and 65th Annual Meeting, paper SL1.4, Oct. 8–13, 1995 and R. Vintner, K. Mosegaard, I. Abatzis, C. Anderson, V. O. Vejbaek, and P. H. Nielson, "3D Seismic Texture Classification", Society of Petroleum Engineers 35482, 1996, discuss textural analysis of seismic data as well as classification of textural attributes using a version of principal-component analysis and probability distributions. These publications, while using textural analysis methods on seismic data, do not take advantage of probabilistic neural networks or the dynamic use of probability values to optimize the classification. These methods also do not utilize an interactive training scheme and the textural analysis is not dip-steered. The process of guiding a calculation by the stratigraphic layering defined by the dip of the seismic reflectors is called dip-steering.

D. Gao, "The First-Order and the Second-Order Seismic Textures: Implications for quantitative Seismic Interpretation and Hydrocarbon Exploration", 1999, describes the use of standard textural analysis to produce seismic textural attributes that quantify reflection strength, continuity, and geometry. This abstract does not, however, describe methods of classification of textural attributes. Specifically, Gao, 1999, does not use a probabilistic neural network nor interactive interpreter training of the neural network. Additionally, the textural analysis is not dip-steered.

Turhan Taner, in combination with Rock Solid Images and the Consortium for Computation and Interpretive Use of Seismic Attributes, employs a method in which various seismic attributes are used to interactively train a neural network. However, textural attributes are not used and the network employed is a fully-connected back-propagation neural network, rather than a probabilistic neural network.

P. Meldahl, R. Heggland, P. F. M. de Groot, and A. H. Brill, "The Chimney Cube, an Example of Semi-Automated Detection of Seismic Objects by Directive Attributes and Neural Networks: Part I; Methodology", "The Chimney Cube, an Example of Semi-Automated Detection of Seismic Objects by Directive Attributes and Neural Networks: Part II; Interpretation", and British Patent with International Publication No. WO 00/16125, "Method of Seismic Signal Processing" use seismic attributes to interactively train a neural network and produce a facies volume. However, in the training and production of the chimney cube, only one class of item, instead of multiple classes, is focussed on and classified at a time. Accordingly, only two final output nodes are used in the neural network architecture. A probability cube is computed and then, as a post-processing phase, on-off thresholds are drawn to decide if the object is of the class of interest or not. A complex Wigner-Radon transformation scheme is used for dip-steering the seismic attributes. The attributes are manually chosen for individual classes.

Elf Acquitaine, "Automatic Seismic Pattern Recognition", FR 2738920 19970321 and EP 808467 19971126, describe a seismic trace-based method for seismic pattern recognition. Each seismic trace within a user-defined interval is decomposed into a user-defined number of empirical-orthogonal functions. These derived functions are then classified using a neural network based classification algorithm, rather than interpreter-trained textural analysis.

Thus, there exists a need to generate, in a computationally efficient manner, a process that enables the rapid, objective classification of seismic data so that it can be exploited in the seismic facies mapping process. This process must also mimic the process employed by and results obtained manually by the seismic interpreter.

SUMMARY OF THE INVENTION

The present invention is a method for identifying seismic facies in a volume of seismic data. First, a plurality of initial textural attributes representative of the volume of seismic data are calculated. Next, a probabilistic neural network is constructed from the calculated initial textural attributes. Then, final textural attributes are calculated throughout the volume of seismic data. Finally, the calculated textural attributes are classified using the constructed probabilistic neural network.

BRIEF DESCRIPTION OF THE DRAWINGS

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the spirit and scope of the invention, as defined by the appended claims.

DETAILED DESCRIPTION OF THE INVENTION.

Figure 1:
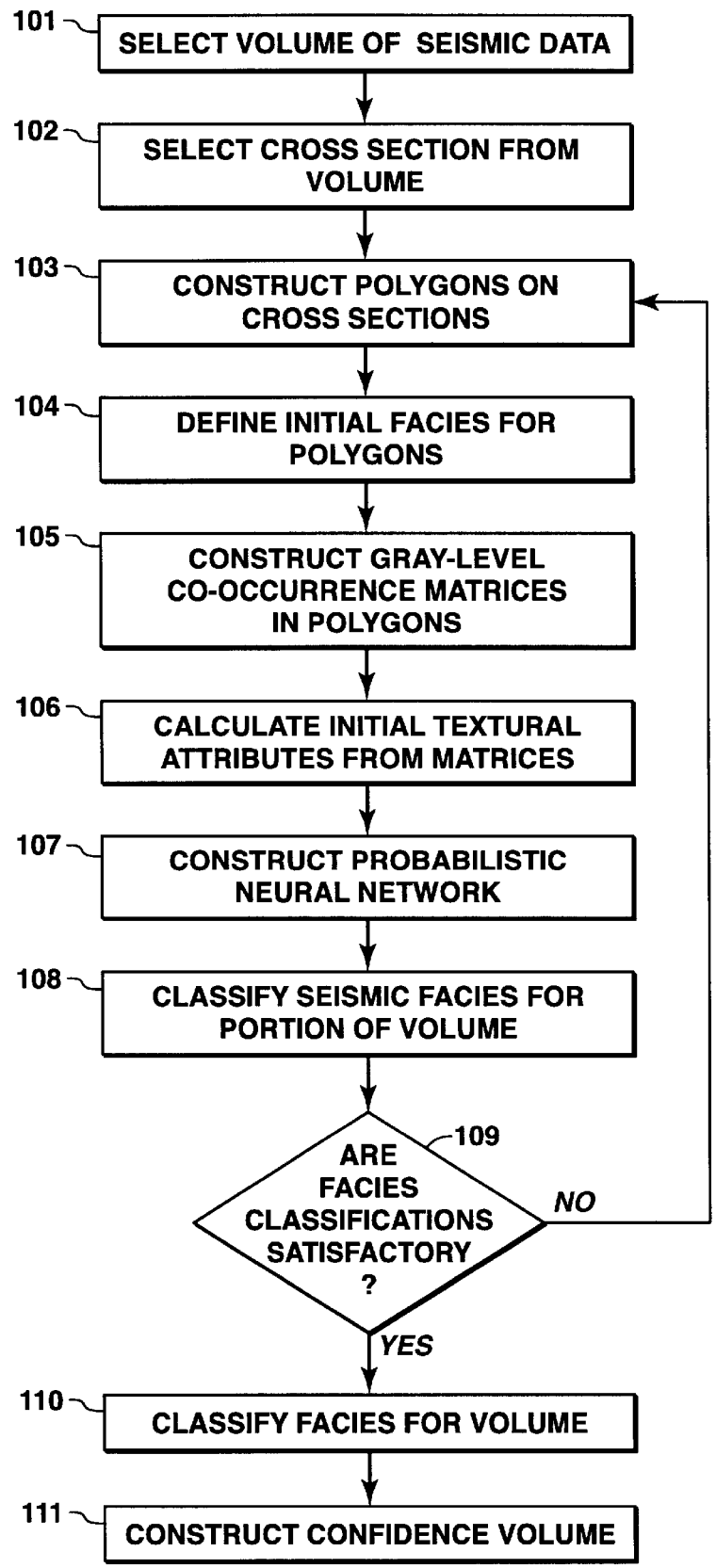
FIG. 1 is a flow chart illustrating the method of an embodiment of the present invention.

The present invention is a method of recognizing and mapping seismic facies in seismic data, particularly in seismic amplitude data, although the method is applicable to other seismic attributes, as well. FIG. 1 is a flow chart illustrating the method of an embodiment of the present invention. First, in step 101, a 3D volume of seismic data is selected. Although 3D volumes of data are discussed, the method works equally well for 2D data sets. This seismic data volume will be used to calculate a seismic facies volume and corresponding confidence volumes. Preferably, the seismic data is seismic attribute or amplitude data, including, but not limited to, near, far, and full-stack data.

Next, in step 102, at least one cross-section is selected from the volume of seismic data from step 101. In step 103, a plurality of polygons are constructed on the selected cross-sections from step 102. The polygons need not be the same size, orientation, or from the same stratigraphic interval, but can be distributed throughout the cross-sections and the volume in any appropriate orientation or geometry. Preferably, the polygons are constructed by digitizing them on a display of the selected cross-sections.

The polygons in step 103 are constructed to contain an image representative of a facies type from the volume of seismic data. Preferably, enough examples of each facies type of interest should be provided to characterize the variation present in the input volume of seismic data from step 101. The facies types will be represented by seismic texture. Seismic texture is a characteristic that quantifies many aspects of the standard seismic facies description performed by a seismic interpreter. Seismic texture is a quantitative measure of the reflection amplitude, continuity, and internal configuration of reflectors. Seismic textures can be described as smooth or rough, small-scale or large-scale and are quantified through standard statistical methods, described as textural attributes. Seismic texture is inherently a multi-trace seismic attribute, and thus is significantly different from many traditionally calculated seismic attributes based on single traces. The analysis of seismic texture thus mimics the visually-based analysis process of a seismic interpreter in a way that traditional attribute analysis does not. An interpreter does not examine one or two traces at a time. Rather, the interpreter examines an ensemble of traces as an image to render a classification. This different analysis approach offers the potential to capture reflection geometry within an entire region of investigation Textural analysis techniques describe the spatial organization of pixel values within a defined region, such as the above polygons on the cross-sections. In general, this region, the textural analysis window, is called a "texel". One such technique used to quantify an image's texture in a texel employs an image transformation that results in Gray-Level Co-occurrence Matrices. Gray-Level Co-occurrence Matrices describe the spatial relationships between pixels of a small region within the larger image, the texel. In practice, Gray-Level Co-occurrence Matrices are computed in overlapping texels so that any transition between textural classes within the entire image can be fully observed. The overlapping texels sweep across and down through the image until the entire image is processed.

Gray-Level Co-occurrence Matrices are matrices with dimensions N×N, were N is the number of gray levels used to quantify the image. For example, 8 bit data has $2^8 = 256$ gray levels, and a Gray-Level Co-occurrence Matrix constructed from this image will be a matrix that has 256 rows and 256 columns. Computation and analysis of Gray-Level Co-occurrence Matrices is an expensive computational task, with computational requirements proportional to $N^2$. Each element within the Gray-Level Co-occurrence Matrix expresses the relative frequency of occurrence of two points, with respective pixel values i and j, at a distance $D(d, \theta)$ from one another within the texel. For example, if pixel A has value i and is a distance D from pixel B with value j, then the Gray-Level Co-occurrence Matrix position i,j will be incremented by one. This process is performed for each existing pixel set within the texel. In their most general application a Gray-Level Co-occurrence Matrix calculation can reflect both a transition in pixel values and a direction or "grain" within an image. Textural analysis via the construction of a Gray-Level Co-occurrence Matrix from an image texel is effectively the two- (or three-) dimensional extension of one-dimensional Markov Chain analysis.

The structure of seismically-derived Gray-Level Co-occurrence Matrices can be heuristically understood. In homogeneous regions, where homogeneity or continuity is defined in a given direction, differences between pixel values will be low, and the elements close to the diagonal of the Gray-Level Co-occurrence Matrices will therefore have higher values. Less homogeneous regions will yield higher differences between adjacent pixel values and resulting Gray-Level Co-occurrence Matrices will therefore have higher values further away from the diagonal. Average pixel value also expresses itself in the Gray-Level Co-occurrence Matrix. Regions of low amplitude have Gray-Level Co-occurrence Matrices with values clustered near the center. Regions with higher amplitude, on the other hand, have more distributed Gray-Level Co-occurrence Matrix values, either along the diagonal for continuous textures or throughout the Gray-Level Co-occurrence Matrix in more discontinuous textures.

In step 104, initial facies classifications are provided for the polygons selected in step 103. Examples of facies classifications typically used in the present invention include, but are not limited to, high amplitude continuous (HAC), high amplitude semi-continuous (HASC), moderate amplitude continuous (MAC), moderate amplitude semi-continuous (MASC), low amplitude continuous (LAC), low amplitude semi-continuous (LASC), chaotic, and transparent. Examples of the first six classifications are shown in FIGS. 3B, 3C, 3G, 3D, 3E, and 3F, respectively. In step 105, Gray-Level Co-occurrence Matrices are thus constructed from the images in the constructed polygons from step 103 for the facies from step 104. Statistical transformations of these matrices then describe the spatial relationships between pixels of a small region. In step 106, initial textural attributes are calculated from the constructed Gray-Level Co-occurrence Matrices from step 104, using a user-defined moving window. This calculation can generally be called the production of the seismic texture values in the seismic data. In order to closely mimic the process followed by a seismic interpreter, 2D textural attributes are preferably calculated and then filtered in time slice to mimic a fully 3D operation. Alternatively, 3D textural attributes can also be calculated and used to characterize the seismic facies.

Gray-Level Co-occurrence Matrices are not efficiently interpreted directly, and are more effectively described by scalar statistical measures, called textural attributes. Textural attributes can be divided into first- and second-order descriptors. First-order statistics quantify the global distribution of pixel values within an image, and can be calculated directly from a texel using standard statistical techniques even without an intermediate Gray-Level Co-occurrence Matrix transformation. Average absolute amplitude and standard deviation of amplitude values within a texel are examples of a first-order textural attributes, and are useful in delineating amplitude anomalies and reflection strength. Derived attributes such as instantaneous amplitude, phase, and frequency can also be used to produce first-order statistics.

First-order statistics are a beginning approach toward a detailed texture quantification, and although some geophysical regions can be coarsely defined from distinct intervals of pixel values, in general, an individual texel cannot be adequately described on the basis of their first-order statistics alone. For example, a high-amplitude chaotic region of a seismic image cannot necessarily be separated from a high- or even moderate-amplitude continuous region using only average amplitude values.

Second-order statistics of an image quantify the spatial relationships of pixels within the image, and are calculated via the intermediate transform to the Gray-Level Co-occurrence Matrix. Second-order statistics, statistics of the Gray-Level Co-occurrence Matrix, capture trace shape characteristics, reflection geometry, and reflection continuity, in addition to amplitude strength. Second-order statistics of a texel are a multi-trace, image attribute, which allows reflection geometry and continuity to be captured through analysis of the dip-steered Gray-Level Co-occurrence Matrix.

Textural attributes preferably used in the present invention include, but are not restricted to, textural homogeneity, inertia (also knows as the element-difference moment or contrast), entropy, and energy (also known as uniformity). The mathematical expressions of these textural attributes are given as:

homogeneity=$\Sigma_i\Sigma_j 1/1+(i-j)^2 c_{ij}$, inertia=$1/(n-1)^2 \Sigma_i\Sigma_j (i-j)^2 c_{ij}$, entropy=$-1/2 \log n \Sigma_i \Sigma_j c_{ij} \log c_{ij}$, energy=$\Sigma_i\Sigma_j c_{ij}^2$, The first textural attribute, textural homogeneity, quantifies the amount of local similarities inside the texel. Because it is inversely proportional to $(i-j)2$, local textural homogeneity will be larger for Gray-Level Co-occurrence Matrices with elements concentrated near the diagonal. These Gray-Level Co-occurrence Matrices correspond to textures of organized and poorly contrasted features with only a few gray levels at the same distance and azimuth from one another. Lower values of textural homogeneity will correspond to larger values of the Gray-Level Co-occurrence Matrix further away from the diagonal of the matrix, that is many differing gray levels that the same distance and azimuth. These characteristics make textural homogeneity particularly useful for quantifying continuity.

The second textural attribute, textural inertia, is indicative of the contrast of the Gray-Level Co-occurrence Matrix, and is the opposite measure to textural homogeneity. Whereas textural homogeneity will be low for a highly contrasted image, textural inertia will be high.

The third textural attribute, textural entropy, measures the lack of spatial organization inside the computation window. Textural entropy is high when all elements of the Gray-Level Co-occurrence Matrix are equal, corresponding to a rough texture, and low then the texture is more homogeneous or smoother.

The fourth textural attribute, textural energy, is also indicative of the spatial organization within the computational window. Textural energy is lowest when all elements of the Gray-Level Co-occurrence Matrix are equal, the opposite of textural entropy. In this case, all or most gray levels within the computational window are equally probable. This is characteristic of a rough texture. Conversely, the highest values of textural energy show the presence in the Gray-Level Co-occurrence Matrix of high values. In this case, only a few gray levels are dominant. The region inside this computation window is more homogeneous, or exhibits some regular character.

In step 107, a probabilistic neural network is constructed from the initial textural attributes, along with their associated initial facies classifications, from steps 105 and 106, respectively. A neural network is an interconnected assembly of simple processing elements. The processing ability of the neural network is stored in the connection strengths, or weights, obtained by a process of adaptation to, or learning from, a set of training patterns. One of the advantages of neural networks is the ability to train or modify the connection strengths within the network to produce desired results.

In a classification application, a neural network can be thought of as special case of a supervised classification scheme in that the training of a neural network is a supervised exercise. Once sufficiently trained on a number of calibration images, the neural network can then be applied to the remaining images in a data volume.

Computationally, the connectivity of the nodes within a general neural network, the weights, modify an input vector of attributes and pass the modified values on to the next layer of the network. Through training, the weights of the network are modified such that on a specific set of training examples, modification of the input attribute vectors produce a desirable outcome. The training of a network and modification of connection weights results in the production of a decision surface for the network. A decision surface is an n-dimensional surface that allows the network to separate the input training data into categories. One of the advantages of a neural network algorithm over more standard classification schemes is the ability to produce non-linear boundaries. Typical classification or prediction problems commonly have only three layers, an first, input layer; a second, "hidden" layer; and a third, output layer.

Probabilistic neural networks are parallel implementations of a standard Bayesian classifier. A probabilistic neural network is a three-layer network that can efficiently perform pattern classification. Mathematically, these probabilistic neural networks are very analogous to kriging, where proximity to known points guide the classification and prediction of unknown points. In its standard form, the probabilistic neural network is not trained in the same way as the more-traditional neural network described above. Rather, the training vectors simply become the weight vectors in the first layer of the network. This simpler approach gives probabilistic neural networks the advantage of not requiring extensive training. In seismic textural analysis, for example, the textural attributes of the training images supply weight vectors in the first layer of the network. This results in a dramatic speed advantage in the training phase over more traditional types of neural network architectures, such as fully-connected back propagation architectures. Further, a probabilistic neural network tends to generalize well, whereas more traditional networks, even with large amounts of training data, are not guaranteed to converge and generalize to data not used in the training phase.

When an input pattern is presented to a probabilistic neural network, the first, or input, layer computes distances from the input vector to the training input vectors, and produces a vector whose elements indicate how close the input is to a training input. The second layer sums these contributions for each class of inputs to produce as its net output a vector of probabilities. This leads to another advantage of using probabilistic neural networks. This is the ability to extract classification probabilities directly from the second, or hidden, layer, in addition to the classification of the maximum probability from the third, or output, layer.

In the present invention, the input training points for the probabilistic neural network constructed in step 107 are the initial textural attributes from step 105 and the associated initial facies classifications from step 106. The output from the probabilistic neural network will be facies classifications (and a probability volume, to be discussed below). The probabilistic neural network could then be used to classify the entire volume of seismic data. However, at this point it is preferred to make a quality control check and, if deemed necessary, to modify or completely retrain the probabilistic neural network.

Thus, in step 108, the initial probabilistic neural network is used to classify the facies in a portion of the volume of seismic data from step 101. Preferably, this portion is one of the cross sections selected in step 102. In step 109, a determination is made whether the facies classification of the portion of the seismic data volume is satisfactory. If the determination is that the facies classification is not satisfactory, then the process returns to step 103. The training set can be modified either through deletion of existing polygons or addition of new polygons. The probabilistic neural network is then re-created with the modified training set, and again checked. This ability to train and quality check the probabilistic neural network and then interactively modify a pre-existing training set allows the present invention to reproduce a facies classification that an interpreter would have produced manually. Only then will the process continue to classify the entire seismic data volume. Thus, if the determination in step 109 is that the partial facies classification is satisfactory, then the process continues to step 110.

In step 110, final facies classifications are calculated throughout the volume of seismic data from step 101 using the probabilistic neural network constructed in step 107. This produces a seismic facies classification volume, based on the seismic texture attributes produced from the original, user-defined polygons.

The quality of the seismic facies volume is dependent upon the quality of the input data. Decreasing quality of input data often occurs with increasing depth in the subsurface. Using a single Gray-Level Co-occurrence Matrix calculation window size for the entire volume contributes to this negative effect. Results are improved by varying the window size throughout the volume. Preferably, the window size is made larger as data frequency decreases with increasing depth. This mode works in combination with the dynamically adjusted window size based on a user-defined confidence level. In a further alternative embodiment to deal with decreasing quality of seismic data, the data can be initially filtered with a convolution or median filter to smooth the data prior to input.

Finally, in step 111, a confidence volume is also created from the output of the probabilistic neural network. In an alternative embodiment, the confidence volume can be used dynamically during the calculation of the seismic facies classification volume in step 110. If a confidence falls below a user-defined level, the calculation window size can be automatically adjusted until the confidence level rises above acceptable levels, and the facies is recalculated and reclassified accordingly.

In a further alternative embodiment, the production of the Gray-Level Co-occurrence Matrices in step 104 can be dip-steered. The stratigraphic framework of a particular geologic setting is an important aspect that is always considered, albeit unconsciously, by the seismic interpreter. Seismic facies interpreters, for example, do not consider continuity solely in the time- plane. Rather, they judge continuity following the stratigraphic layering defined by dip of seismic reflectors. Texture analysis and construction of a Gray-Level Co-occurrence Matrix for a texel, as described above, is dependent on the look direction or azimuth, $\theta$, in which the pixels within the texel are related. Textural analysis applied to seismic data is extremely sensitive to the stratigraphic framework of the texel, and must also follow the stratigraphic dip of the reflectors to properly mimic the process performed by the human interpreter. Following the stratigraphic dip in a Gray-Level Co-occurrence Matrix calculation maximizes the continuity of the image as expressed in the Gray-Level Co-occurrence Matrix. The process of guiding a calculation by stratigraphic dip is called dip-steering.

Texture analysis requires a high degree of resolution in stratigraphic geometry to properly steer the Gray-Level Co-occurrence Matrix calculation. To achieve the required resolution, the multi-trace, image, nature of the texel is exploited, and dips within an image are estimated via a gradient-based technique. The first step in this technique requires calculation of the horizontal (dx) and vertical (dy) gradient of pixel values within the image. The local dip of the reflectors is then calculated by $$\theta = \tan^{-1}\left(\frac{dy}{dx}\right)$$

The ratio dy/dx has units of time per cdp. However, for reasons of convenience, these units can be ignored and the dip can be expressed in terms of pseudo-degrees relative to a horizontal time-slice.

Finally, as an optional step, a user-defined median filter can be applied to remove noise. Once reflection dip is known everywhere within the texel, the Gray-Level Co-occurrence Matrix calculation utilizes the dip to guide the look-azimuth for each pixel to pixel comparison. Areas of steep dip are poorly imaged with the non-dip-steered Gray-Level Co-occurrence Matrix calculation method. Alternatively, the negative effects of steep dip can be minimized by flattening or dating the volume along a stratigraphic layer, before performing the facies analysis.

The method of the present invention does not require the use of well data as a calibration. This is an advantage in exploration and early development arenas where few wells are available for well-seismic calibration. A calibration can always be, and in general is, performed after the calculation. However, it is not required for application of the method of the present invention. Other methods using seismic attributes and neural networks generally require correlations between seismic and well data.

The present invention has been used to generate seismic facies volumes from standard seismic amplitude data. It has also been used on volumetric AVO (Amplitude Versus Offset) attribute data such as slope-intercept volumes.

Although multiple textural attributes are calculated and used for the facies classification, all required attributes are calculated as needed (on the fly) in the present invention. Thus, only the seismic volume being classified, the facies and probability volumes are stored at any given time. No textural attributes or other volumes are created. This provides an advantage in not requiring large amounts of data storage space for the present invention.

Figure 2:
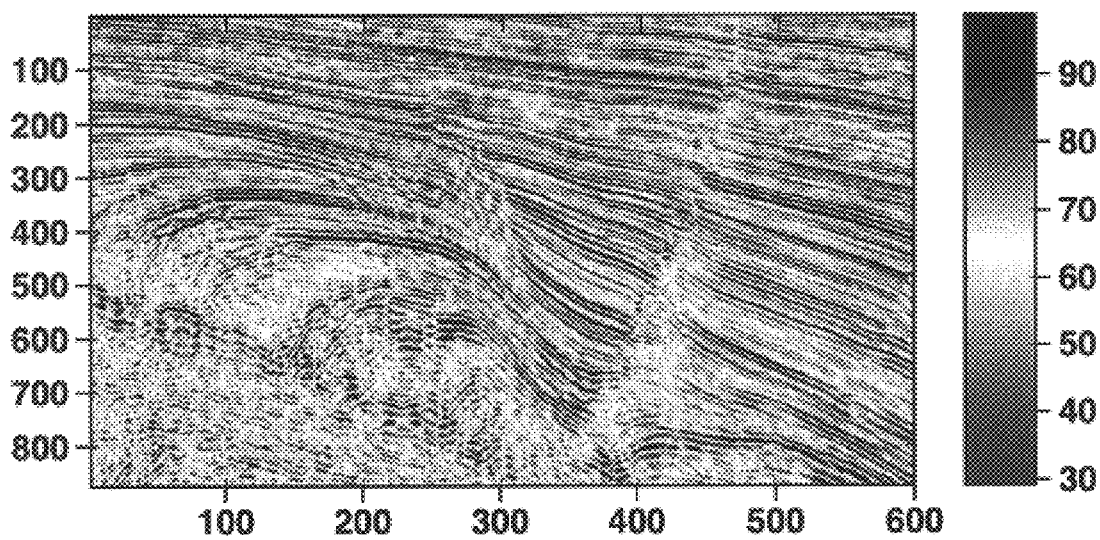
FIG. 2 is an example seismic cross-section from a regional study.
Figure 3A:
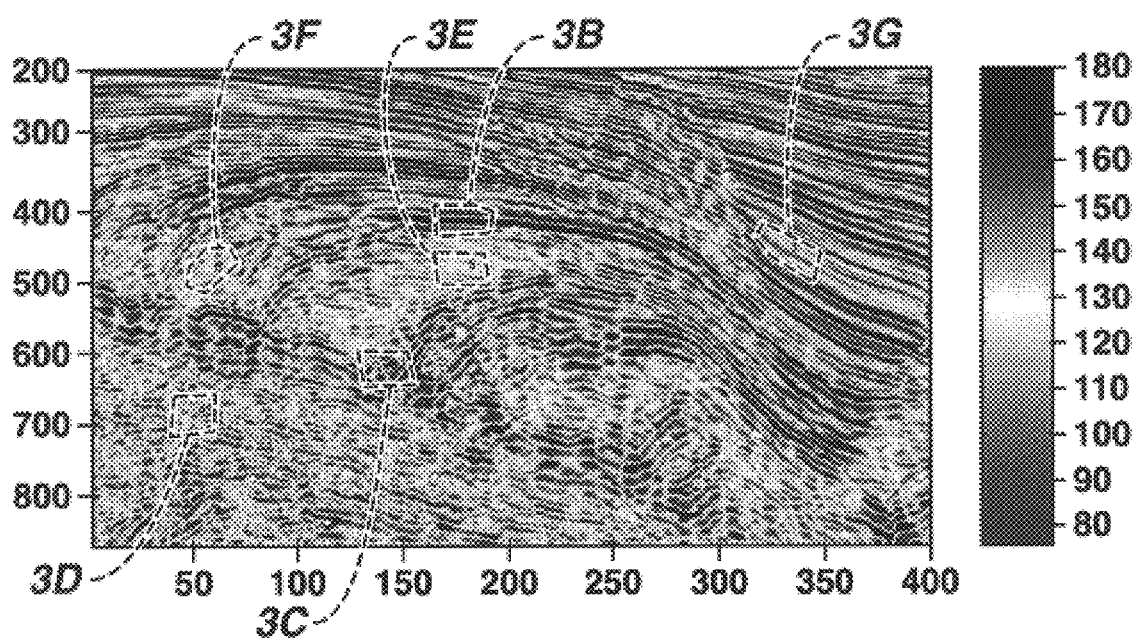
FIG. 3A shows polygons selected for textural analysis of the example shown in FIG. 2.
Figure 3B:
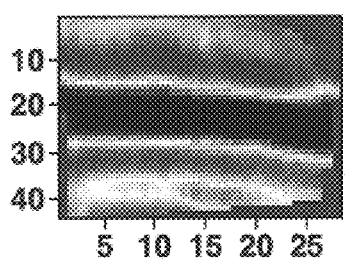
FIGS. 3B–3G are facies classifications corresponding to the polygons in FIG. 3A.
Figure 3C:
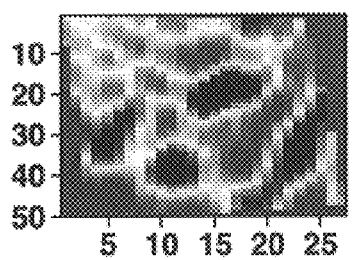
Figure 3D:
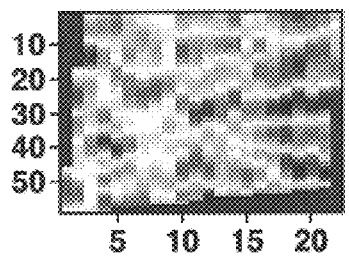
Figure 3E:
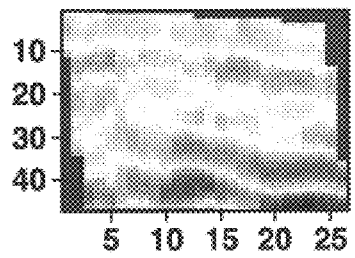
Figure 3F:
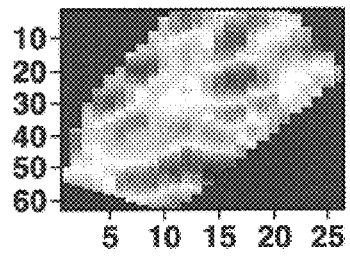
Figure 3G:
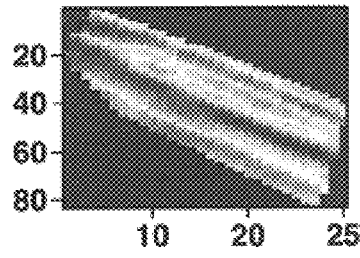
Figure 4:
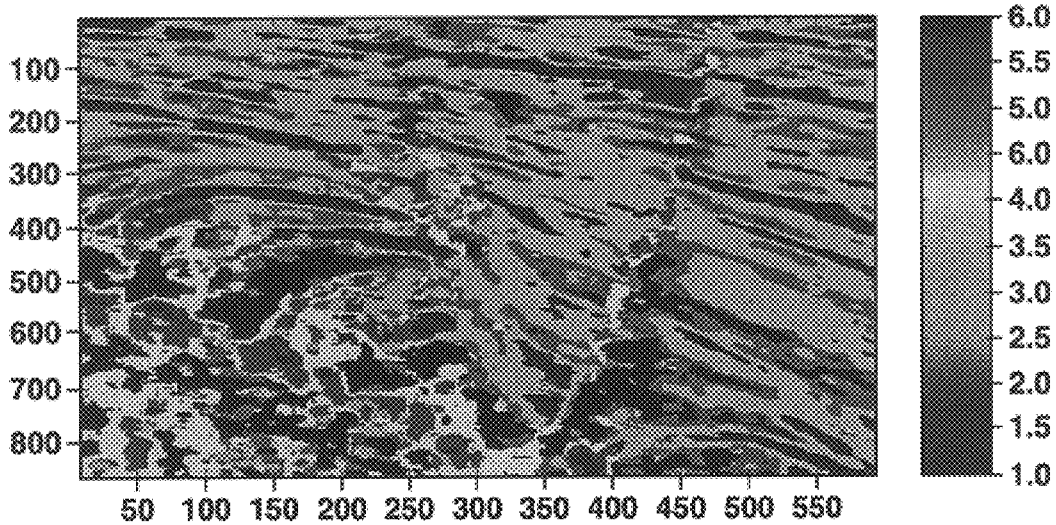
FIG. 4 is a facies classification section for the example shown in FIG. 2, as calculated by the method of the invention.
Figure 5:
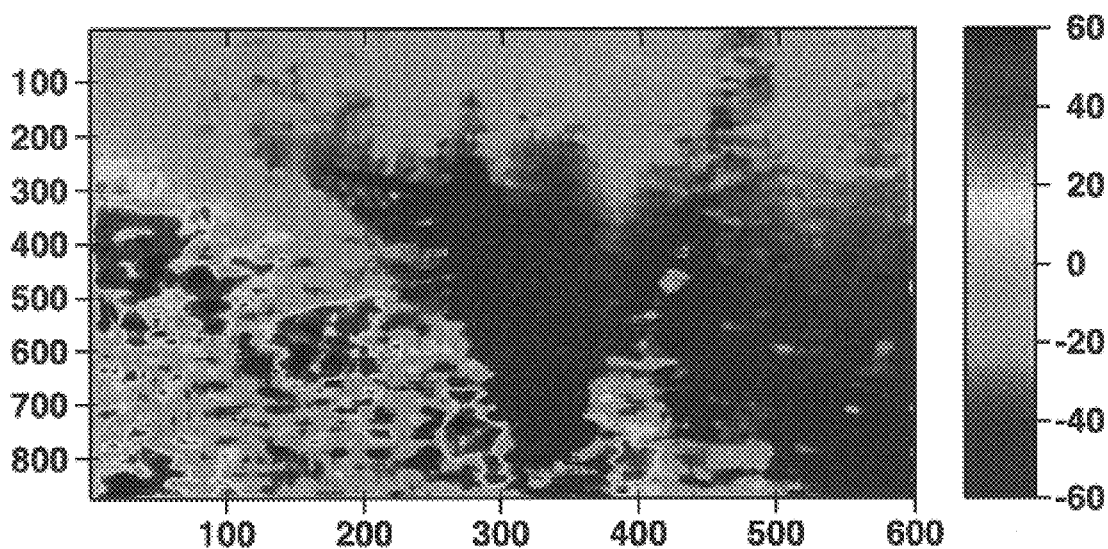
FIG. 5 is a dip section used in dip-steering the example shown in FIG. 2.
Figure 6:
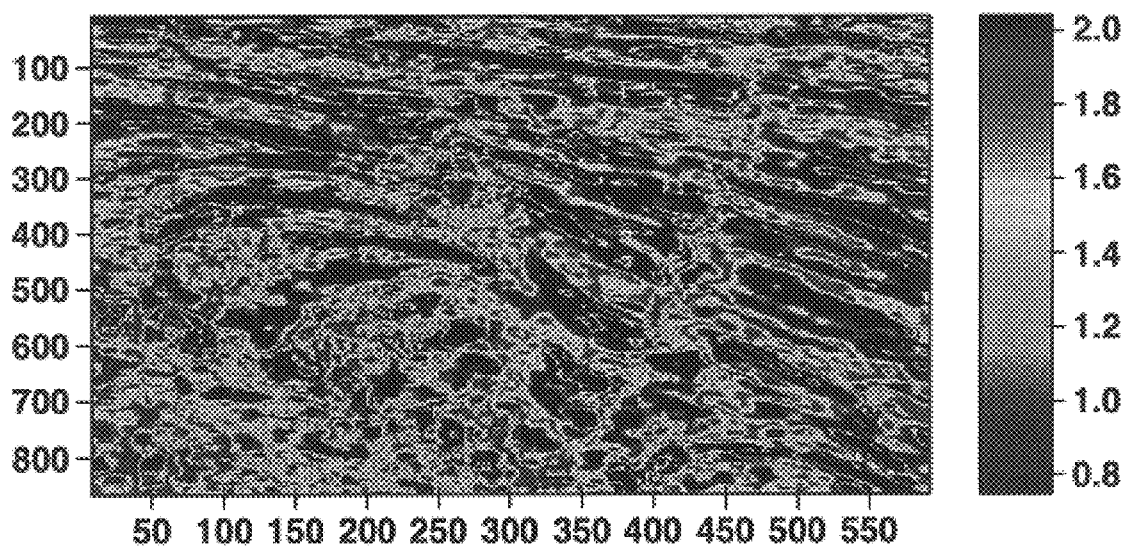
FIG. 6 is a confidence section corresponding to the facies classification section shown in FIG. 4.
Figure 7:
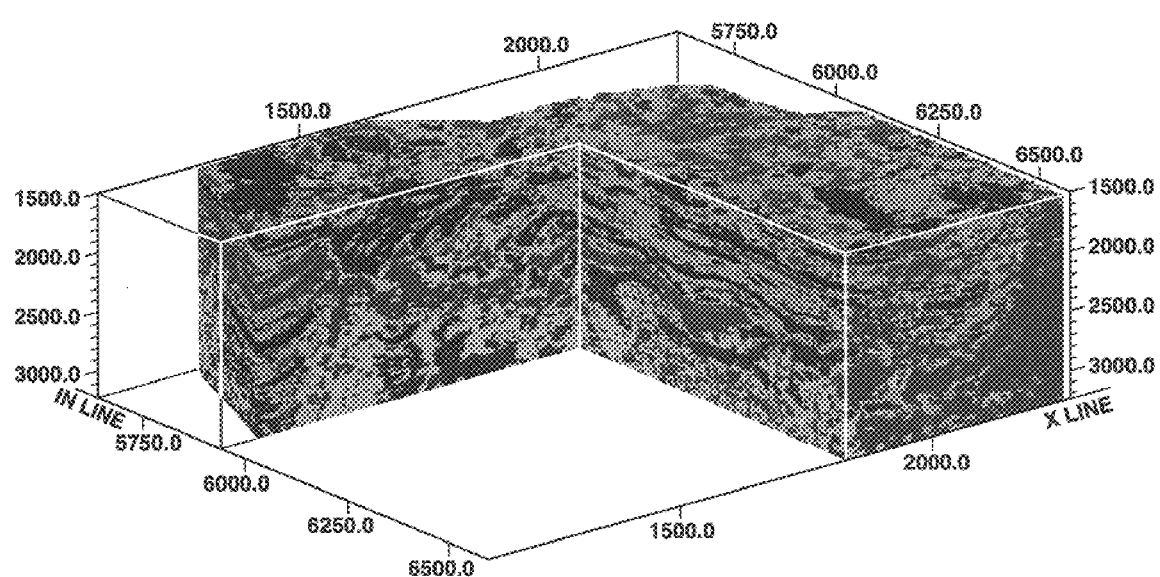
FIG. 7 is a seismic facies volume calculated for the example shown in FIG. 2.

The present invention is capable of mapping seismic facies on a single line or through a 3D volume. The ability to transform standard seismic amplitude or attribute volumes into seismic facies volumes results in significant time reduction, improved accuracy, and reproducibility within the seismic interpretation process. Seismic facies volumes are used for general analysis of reservoir geometry and continuity, for well placement, and to condition geologic models for use in development planning and reservoir management. Example The results of a regional study illustrate the effectiveness of the present invention. FIG. 2 shows a seismic cross-section, as selected in step 102 of FIG. 1. FIG. 3A shows polygons selected for textural analysis, as used in step 103. The corresponding facies classifications are shown in FIGS. 3B–3G, as used in step 106. FIG. 4 shows a resulting facies classification section, as calculated in step 109. FIG. 5 shows the dip section used in dip-steering the FIG. 6 shows a corresponding confidence section, as calculated in step 111. Low confidence values can be observed in and near fault zones, where stratigraphic and structural interactions com-plicate the facies interpretation. Finally, FIG. 7 shows the seismic facies volume for this example, as calculated in step 110.

It should be understood that the invention is not to be unduly limited to the foregoing which has been set forth for illustrative purposes. Various A modifications and alternatives will be apparent to those skilled in the art without departing from the true scope of the invention, as defined in the following claims.

What is claimed is:

1. A method for identifying seismic facies in a volume of seismic data, comprising the steps of:
    (a) calculating a plurality of initial textural attributes representative of the volume of seismic data;
    (b) constructing a probabilistic neural network from the calculated initial textural attributes;
    (c) calculating facies classifications in a portion of the volume of seismic data;
    (d) repeating steps (a) through (c) until the calculated facies classifications in the portion of the volume of seismic data are satisfactory; and
    (e) calculating facies classifications throughout the volume of seismic data using the constructed probabilistic neural network.

2. The method of claim 1, wherein the step of calculating initial textural attributes comprises the steps of:
    selecting at least one cross-section of the volume of seismic data;
    constructing a plurality of polygons on the selected cross-sections; and
    calculating initial textural attributes from images in the constructed polygons.

3. The method of claim 2, wherein the step of calculating textural attributes comprises the steps of:
    constructing Gray-Level Co-occurrence Matrices from the images in the constructed polygons; and
    calculating initial textural attributes from the constructed Gray-Level Co-occurrence Matrices.

4. The method of claim 3, wherein the step of constructing Gray-Level Co-occurrence Matrices further comprises the step of:
    constructing a volume of dip values from the volume of seismic data; and
    applying dip-steering using the dip values.

5. The method of claim 1, wherein the step of calculating textural attributes comprises the steps of:
    positioning a moving window throughout the volume of seismic data; and
    calculating the textural attributes in the moving-window.

6. The method of claim 1, further comprising the step of:
    constructing a volume of confidence values from the constructed probabilistic neural network.

7. The method of claim 6, further comprising the steps of:
    selecting a confidence level; and
    adjusting the size of the moving-window to keep the confidence values above the selected confidence level.

8. The method of claim 1, further comprising the step of:
    displaying the classified textural attributes.

9. The method of claim 1, wherein the seismic data comprises seismic amplitudes.

10. The method of claim 1, wherein the seismic data comprises seismic attributes.

* * * * *